US007790294B2

(12) United States Patent
Macguire et al.

(10) Patent No.: US 7,790,294 B2
(45) Date of Patent: Sep. 7, 2010

(54) SYSTEM, METHOD, AND APPARATUS FOR THREE-DIMENSIONAL WOVEN METAL PREFORM STRUCTURAL JOINT

(75) Inventors: John C. Macguire, Godley, TX (US); Gregory W. Lundeen, Fort Worth, TX (US); Ronald P. Schmidt, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1088 days.

(21) Appl. No.: 11/481,326

(22) Filed: Jul. 5, 2006

(65) Prior Publication Data

US 2008/0008898 A1 Jan. 10, 2008

(51) Int. Cl.
*B32B 5/02* (2006.01)
*B21C 37/00* (2006.01)
(52) U.S. Cl. ............... 428/608; 428/293.1; 428/614
(58) Field of Classification Search .................. None
See application file for complete search history.

(56) References Cited

U.S. PATENT DOCUMENTS

| | | | | |
|---|---|---|---|---|
| 2,694,852 A * | 11/1954 | Rogers | ............... | 428/608 |
| 3,088,019 A | 4/1963 | Crump | | |
| 3,764,277 A * | 10/1973 | Hollis | ............... | 428/555 |
| 4,522,859 A | 6/1985 | Blair | | |
| 4,529,836 A * | 7/1985 | Powers et al. | ......... | 174/94 R |
| 4,671,470 A | 6/1987 | Jonas | | |
| 4,843,693 A | 7/1989 | Chisholm | | |
| 4,886,203 A * | 12/1989 | Puzrin et al. | ........ | 228/126 |
| 4,888,451 A | 12/1989 | Toni et al. | | |
| 5,698,316 A | 12/1997 | Kuras et al. | | |
| 6,718,713 B2 * | 4/2004 | McKague et al. | ....... | 52/309.13 |
| 6,821,368 B2 * | 11/2004 | Benson et al. | ......... | 156/92 |
| 6,835,261 B2 * | 12/2004 | Schmidt | ............... | 156/92 |
| 6,849,150 B1 * | 2/2005 | Schmidt | ............... | 156/285 |

* cited by examiner

*Primary Examiner*—Jennifer C McNeil
*Assistant Examiner*—Adam C Krupicka
(74) *Attorney, Agent, or Firm*—Bracewell & Giuliani LLP

(57) ABSTRACT

A three-dimensional, woven metal fiber preform and metal braze matrix forms a high temperature metallic structural joint. The preform is used with a braze alloy matrix to join a structural skin to a flangeless frame. This same basic joint can be used to create large complex structures with very little tooling. The three-dimensional woven metal preform is a flexible element that conforms to match the skin and flangeless frame, thereby avoiding high costs associated with precision fixturing. A high temperature braze metal is used as a matrix for the wire and to join the woven preform to the skin and the frame. The edges of the preform are tapered to a feather edge to avoid stress concentrations and stiffness mismatch.

13 Claims, 4 Drawing Sheets

SYSTEM, METHOD, AND APPARATUS FOR THREE-DIMENSIONAL WOVEN METAL PREFORM STRUCTURAL JOINT

BACKGROUND OF THE INVENTION

1. Technical Field

The present invention relates in general to structural joints and, in particular, to an improved system, method, and apparatus for a three-dimensional, woven metal preform structural joint.

2. Description of the Related Art

Brazed and welded metal sandwich structures have been in limited use in the aerospace industry for decades. Structures of this type are especially attractive for high speed and high temperature applications. However, these structures have been traditionally very expensive due to elaborate tooling and fixturing needed to join panels together. The joint areas also typically have problems with fatigue, especially in high acoustic areas.

Conventional joints in high temperature metal sandwich structures usually rely on welds or braze joints between the sandwich skins and the machined or formed metal fittings and connectors. These fittings and connectors must be cut and positioned to precise tolerances during furnace operations to obtain acceptable quality joints. Such designs require expensive fixturing and precise welding or brazing. The sandwich structure adjacent to the fittings is susceptible to fatigue loading due to the stiffness mismatch. Although these designs are workable, an improved design for high temperature applications would be desirable.

SUMMARY OF THE INVENTION

One embodiment of a system, method, and apparatus utilizes woven metal fibers and metal matrix materials that are joined to form metal structures, such as a high temperature metal sandwiches. These structures are formed without structural fasteners or with only a minimum number of fasteners for tooling purposes. Very fine metal wires and/or fibers are woven into a three-dimensional connector. The connector is used with a braze alloy matrix to join a structural skin to a flangeless frame. This same basic joint can be used to create large complex structures with very little tooling.

The three-dimensional woven metal wire connector is a flexible element that conforms to match the skin and flangeless frame, thereby avoiding high costs associated with precision fixturing. A high temperature braze metal is used as a matrix for the wire and to join the woven preform to the skin and the frame. The edges of the preform are tapered to a feather edge to avoid stress concentrations and stiffness mismatch.

When held at temperature, one embodiment of the structure forms a resilient alloy through diffusion of the base materials, rather than through melting, as melting would cause the structure to slump into an unusable form. In another embodiment, the metals fuse to form a metallic alloy wherein the materials diffuse into each other over a small diffusion zone.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, a more specific description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
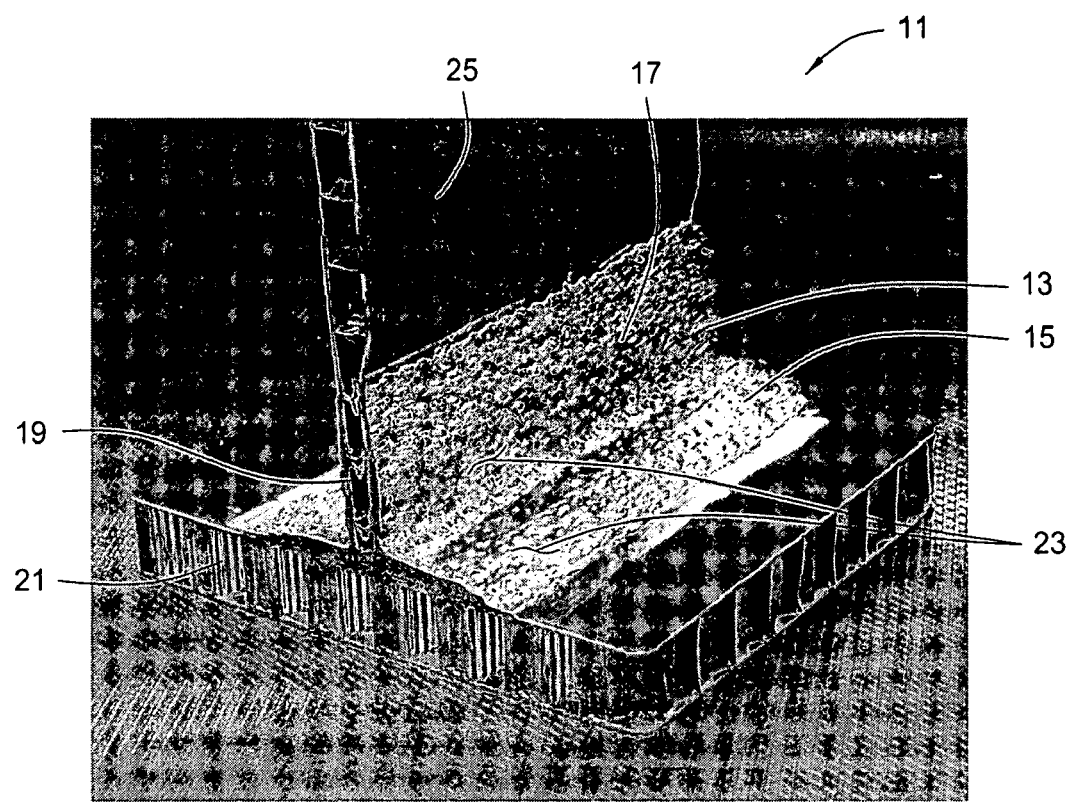
FIG. 1 is an isometric view of one embodiment of a structural joint constructed in accordance with the present invention.
Figure 2:
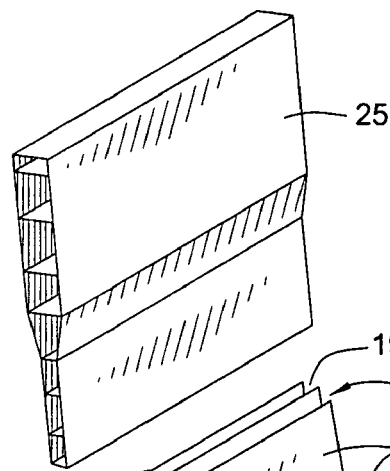
FIG. 2 is an exploded isometric view of the structural joint of FIG. 1 and is constructed in accordance with the present invention.
Figure 2:
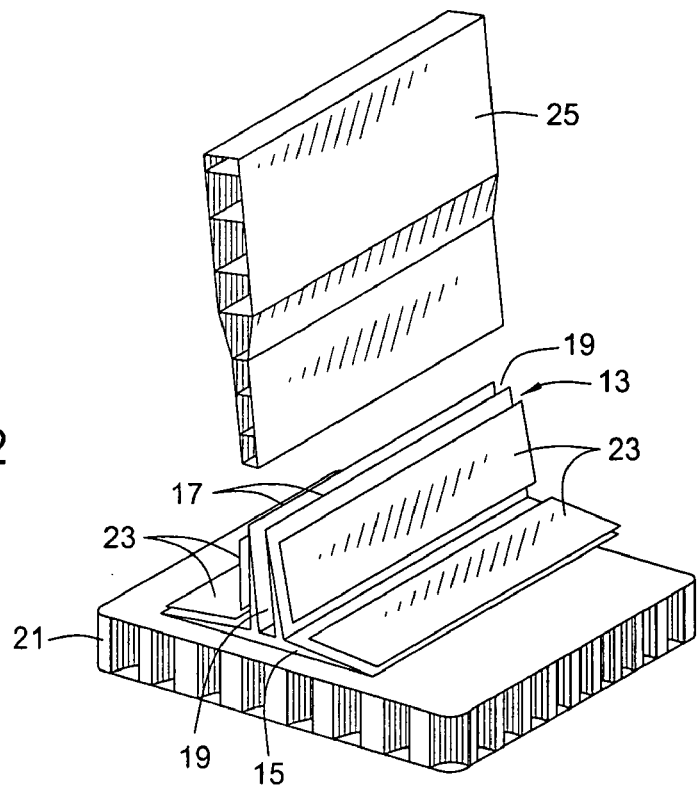
Figure 3A:
FIGS. 3*a* and 3*b* are highly magnified metallurgical sectional views of the structural joint of FIG. 1 and is constructed in accordance with the present invention.
Figure 3B:
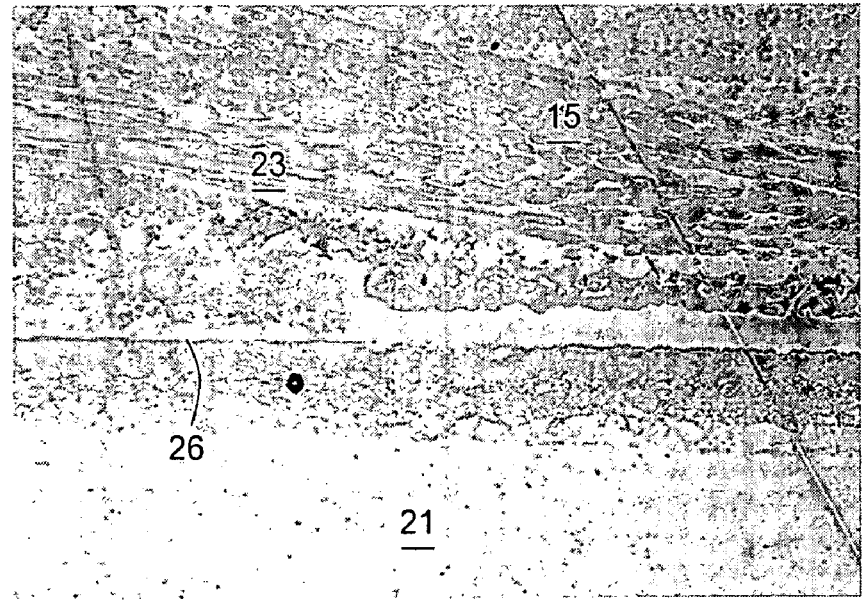
Figure 4:
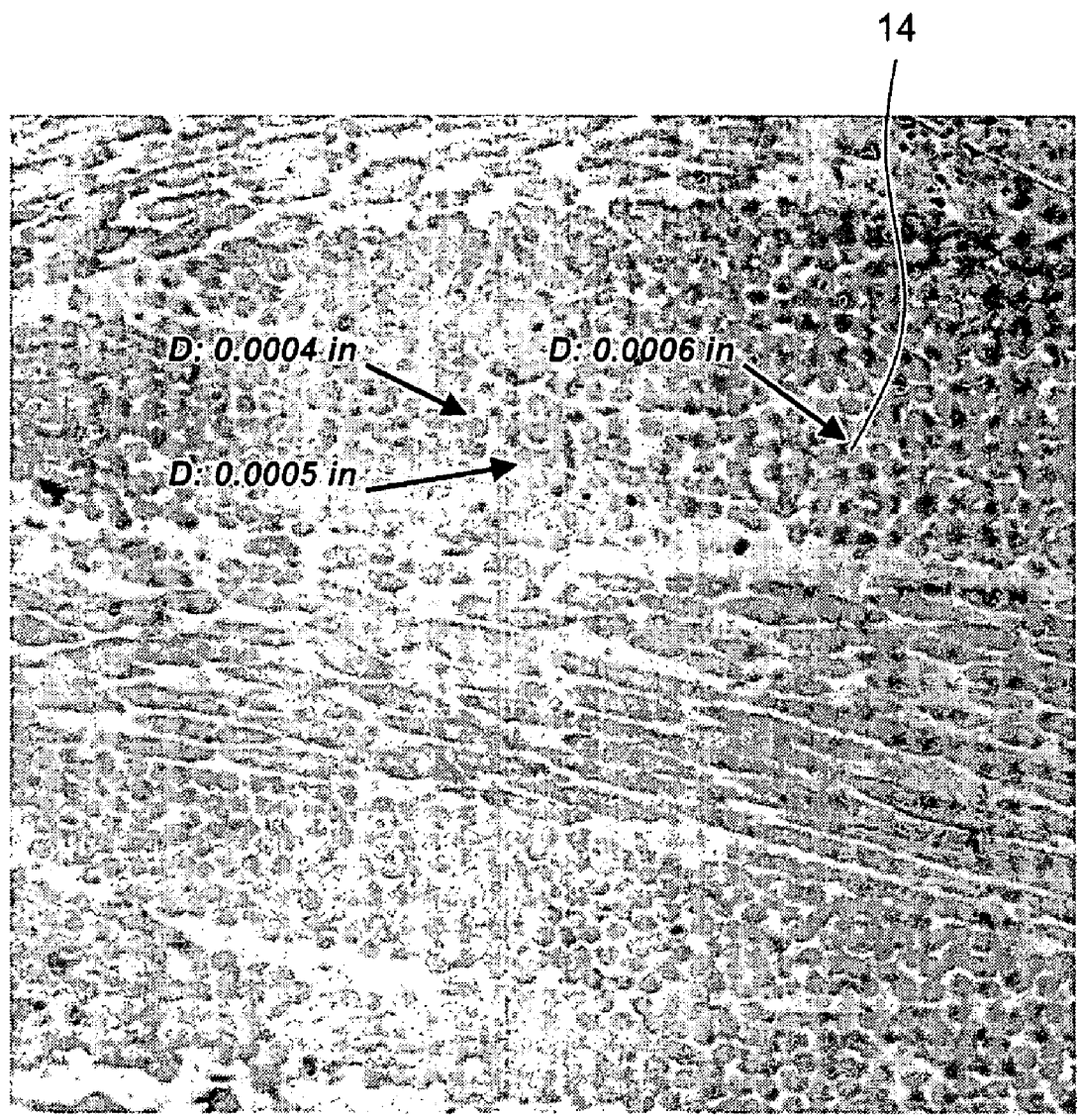
FIG. 4 is a highly magnified metallurgical sectional side view of the structure of FIG. 1 and is constructed in accordance with the present invention.

Referring to FIGS. 1-4, one embodiment of a system and apparatus for forming a structural joint is shown. The structural joint 11 comprises a preform 13 that is woven formed from flexible metal fibers 14 (FIG. 4). In one embodiment, preform 13 is a three-dimensional shape. However, the preform also may comprise a simple, two-dimension connector of nominal thickness for joining two components. In the embodiment shown, the preform 13 has a base 15 and a pair of legs 17 extending from the base to form a channel 19 therebetween. A first component 21 is joined to the base 15 of the preform with a braze 23. A second component 25 is located in the channel 19 of the preform 13 and is joined thereto with the braze 23. In one embodiment, the preform 13 and the first and second components 21, 25 are joined together without fasteners. The first component 21 may comprise a structural skin and the second component may comprise a flangeless frame.

As shown in FIGS. 3*a* and 3*b*, the braze 23 at least partially diffuses with the preform 13, the first component 21, and the second component 25 to form metallic alloy layers or diffusion zones 26 therebetween to complete the rigid structural joint 11.

Since the preform 13 is formed from flexible metallic fibers, the preform 13 conforms to a shape of the first and second components 21, 25. The braze 23 may comprise a high temperature braze metal alloy that forms a matrix for the wire and to join the woven preform 13 to the skin 21 and the frame 25. The braze 23 may be selected from commercially available braze alloys and form depending upon joint material selection and design. Braze 23 may further comprise a braze alloy in the form of a powder, tape, and braze foil.

The edges of the preform 13 are tapered to a feather edge to avoid stress concentrations and stiffness mismatch. The fiber used to form the preform 13 may be formed from a metal such as stainless steel alloys, titanium alloys, nickel-based alloys, etc. However, still other materials, such as copper, also may be used. In one embodiment, the fibers have a diameter in a range of a few microns to 0.010 inches. Depending on the temperature and other conditions, parameters, etc., used to form the structural joint 11, the fibers of the preform 13 and the braze 23 may remain separate and distinct materials in a connector or structural joint, or, alternatively, both the fibers of the preform 13 and the braze 23 may be diffused into each other to form a homogenous metal alloy connector.

Figure 5:
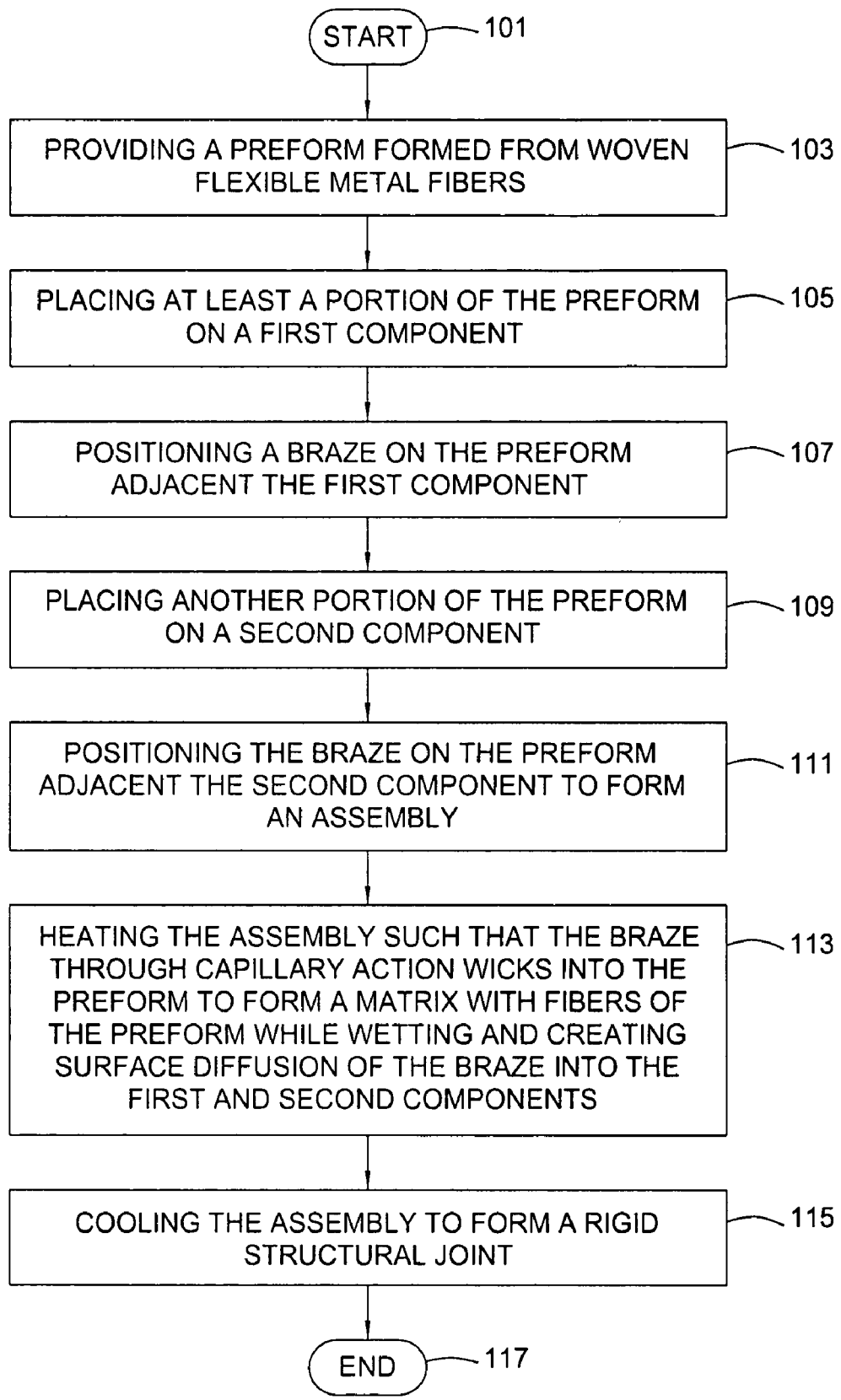
FIG. 5 is a high level flow diagram of one embodiment of a method constructed in accordance with the present invention.

Referring now to FIG. 5, one embodiment of a method of forming a structural joint according to the present invention is illustrated. The method begins as illustrated at step 101, and comprises providing a preform formed from woven, flexible metal fibers (step 103); placing at least a portion of the preform on a first component (step 105); positioning a braze on the preform adjacent the first component (step 107); placing another portion of the preform on a second component (step 109); positioning the braze on the preform adjacent the second component to form an assembly (step 111); heating the assembly such that the braze, through capillary action, wicks into the preform to form a matrix with the fibers of the preform while (e.g., simultaneously) wetting and creating surface diffusion of the braze into the first and second components (step 113); cooling the assembly to form a rigid structural joint (step 115); before ending as indicated at step 117.

The method also may comprise joining the preform and the first and second components together without structural fasteners, and providing the first component as a structural skin, and the second component as a flangeless frame. In addition, one embodiment of the structural joint may be formed in a vacuum or inert atmosphere. After steps 113 and 115, the fibers and braze may remain substantially separate and distinct materials, or, when held at temperature, completely diffuse to form a single homogenous material. Furthermore, common industry practices, such as resistance tack welding, may be used to initially maintain the position of the components before heating.

The present invention has many advantages. The use of metallic fibers in a three-dimensional woven preform with a brazing process creates a metallic structural joint capable of withstanding high temperature environments. Joining applications include honeycomb core panels, sine wave spars, beaded hat stiffeners to skins, and other web-to-flange type structural joints that require reduced weight and metallic structure. The preforms may be used as thermal protection liners, strain isolation layers, or actual structural shapes of brazed metallic fiber woven preforms. The present invention also may be adapted for many applications by fiber orientation to reduce or distribute load. The elimination or reduction in fastener requirements also reduces weight, and facilitates joining complex contoured structures. Furthermore, the metal fiber and braze connector has inherent fatigue resistance since the dissimilar materials provide no homogenous grain structure along which cracks may propagate.

While the invention has been shown or described in only some of its forms, it should be apparent to those skilled in the art that it is not so limited, but is susceptible to various changes without departing from the scope of the invention.

What is claimed is:

1. A structural joint, comprising:
   a preform formed from woven, flexible metal fibers to form a three-dimensional shape, the preform having a base and a pair of legs extending from the base to form a channel therebetween;
   a first component joined to the base of the preform with a braze;
   a second component located in the channel of the preform and joined thereto with the braze to complete the structural joint; and
   wherein both the fibers of the preform and the braze completely diffuse to form a single homogenous material.

2. A structural joint according to claim 1, wherein the first component is a structural skin, the second component is a flangeless frame, the preform conforms to a shape of the structural skin and the flangeless frame, and edges of the preform are tapered to a feather edge.

3. A structural joint according to claim 1, wherein the fibers are formed from a material selected from the group consisting of stainless steel alloys, titanium alloys, and nickel-based alloys; and
   the fibers have a diameter in a range of approximately a few microns to 0.25 millimeters (0.010 inch).

4. A structural joint according to claim 1, wherein the braze is a braze alloy selected from the group consisting of powder, tape, and foil.

5. A structural joint in a condition for brazing, comprising:
   a preform formed from woven, flexible metal fibers to form a three-dimensional shape, the preform having a base and a pair of legs extending from the base to form a channel therebetween, the base having an interior side and two exterior side portions, each extending laterally from one of the legs, each of the legs having an interior side within the channel and an exterior side that joins one of the exterior side portions of the base;
   a first metallic component in abutment with the interior side of the base of the preform;
   a second metallic component having oppositely facing side surfaces that abut the interior sides of the legs; and
   brazing material overlying the exterior side portions of the base and the legs and positioned such that elevating the structural joint to a brazing temperature causes the braze material to melt and diffuse into the preform to join the first and second components to each other.

6. The structural joint according to claim 5, wherein the exterior side portions of the base and the exterior sides of the legs of the preform are free of contact with either of the metallic components.

7. The structural joint according to claim 5, wherein the first metallic component is a structural skin, the second metallic component is a frame having an edge that is joined to the structural skin by the preform, the preform conforms to a shape of the structural skin and the frame, and the exterior side portions of the preform are tapered to a feather edge.

8. The structural joint according to claim 5, wherein the fibers are formed from a material selected from the group consisting of stainless steel alloys, titanium alloys, and nickel-based alloys; and
   the fibers have a diameter in a range of approximately a few microns to 0.25 millimeters (0.010 inch).

9. The structural joint according to claim 5, wherein the brazing material is a braze alloy selected from the group consisting of powder, tape, and foil.

10. The structural joint according to claim 5, wherein the fibers of the preform and the brazing material remain substantially separate and distinct materials in the structural joint after being heated to the brazing temperature.

11. The structural joint according to claim 5, wherein both the fibers of the preform and the brazing material completely diffuse after being heated to the brazing temperature to form a single homogenous material.

12. The structural joint of claim 5, wherein:
   the brazing material comprises at least one tape overlying one of the exterior side portions of the base and the exterior side of one of the legs, and another tape overlying the other of the exterior side portions of the base and the exterior side of the other of the legs.

13. The structural joint of claim 5, wherein:
   the brazing material comprises a first tape overlying one of the exterior side portions of the base;
   a second tape overlying the exterior side of one of the legs;
   a third tape overlying the other of the exterior side portions of the base; and
   a fourth tape overlying the exterior side of the other of the legs.

* * * * *